United States Patent [19]
Noles

[11] Patent Number: 6,037,570
[45] Date of Patent: Mar. 14, 2000

[54] PORTABLE BREWING POT FOR USE IN VEHICLES

[76] Inventor: Terry T. Noles, 5997 Westpoint Rd., Lagrange, Ga. 30240

[21] Appl. No.: 08/888,260

[22] Filed: Jul. 3, 1997

[51] Int. Cl.[7] .................................................... F27D 11/00
[52] U.S. Cl. ........................................... 219/432; 392/447
[58] Field of Search ................................... 219/432, 202, 219/436, 437, 443; 392/444

[56] References Cited

U.S. PATENT DOCUMENTS

| | | | |
|---|---|---|---|
| 3,429,252 | 2/1969 | Colonna | 99/281 |
| 3,662,155 | 5/1972 | Komazaki | 219/429 |
| 3,709,198 | 1/1973 | Williams | 122/14 |
| 3,915,079 | 10/1975 | Balderson | 219/202 |
| 4,120,426 | 10/1978 | Grubbs | 222/183 |
| 4,901,961 | 2/1990 | Gish | 248/217.2 |
| 5,056,424 | 10/1991 | Lai | 99/339 |
| 5,078,289 | 1/1992 | Bolton et al. | 215/228 |
| 5,274,215 | 12/1993 | Jackson | 219/439 |
| 5,283,420 | 2/1994 | Montalto | 219/432 |
| 5,555,746 | 9/1996 | Thompson | 62/457.4 |

Primary Examiner—Teresa Walberg
Assistant Examiner—Thor S. Campbell

[57] ABSTRACT

A new PORTABLE BREWING POT FOR USE IN VEHICLES for BREWING COFFEE AND HOT BEVERAGES WHILE IN A VEHICLE. The inventive device includes a container having a spout extending upwardly from a lower portion thereof. The spout has an open lower end in communication with a hollow interior of the container. The container has a recess formed therein disposed upwardly of a closed lower end thereof. A heating coil is positioned within the hollow interior of the container and is secured to the closed lower end. The heating coil has a pair of female contacts extending outwardly of the closed lower end. A heating plate is provided having a generally cylindrical configuration. The heating plate has an open upper end, a closed lower end and a cylindrical side wall therebetween. The open upper end of the heating plate is dimensioned for receiving the closed lower end of the container therein. An interior surface of the closed lower end of the heating plate has a pair of male contacts extending upwardly therefrom for mating with the female contacts of the heating coil. An interior surface of the cylindrical side wall of the heating plate has a protuberance extending inwardly thereof for engaging the recess in the cylindrical side wall of the container. A power cord is provided having a first end coupled with the pair of male contacts. The power cord has a second end with a cigarette lighter adapter disposed thereon for engaging a cigarette lighter socket of a vehicle.

1 Claim, 2 Drawing Sheets

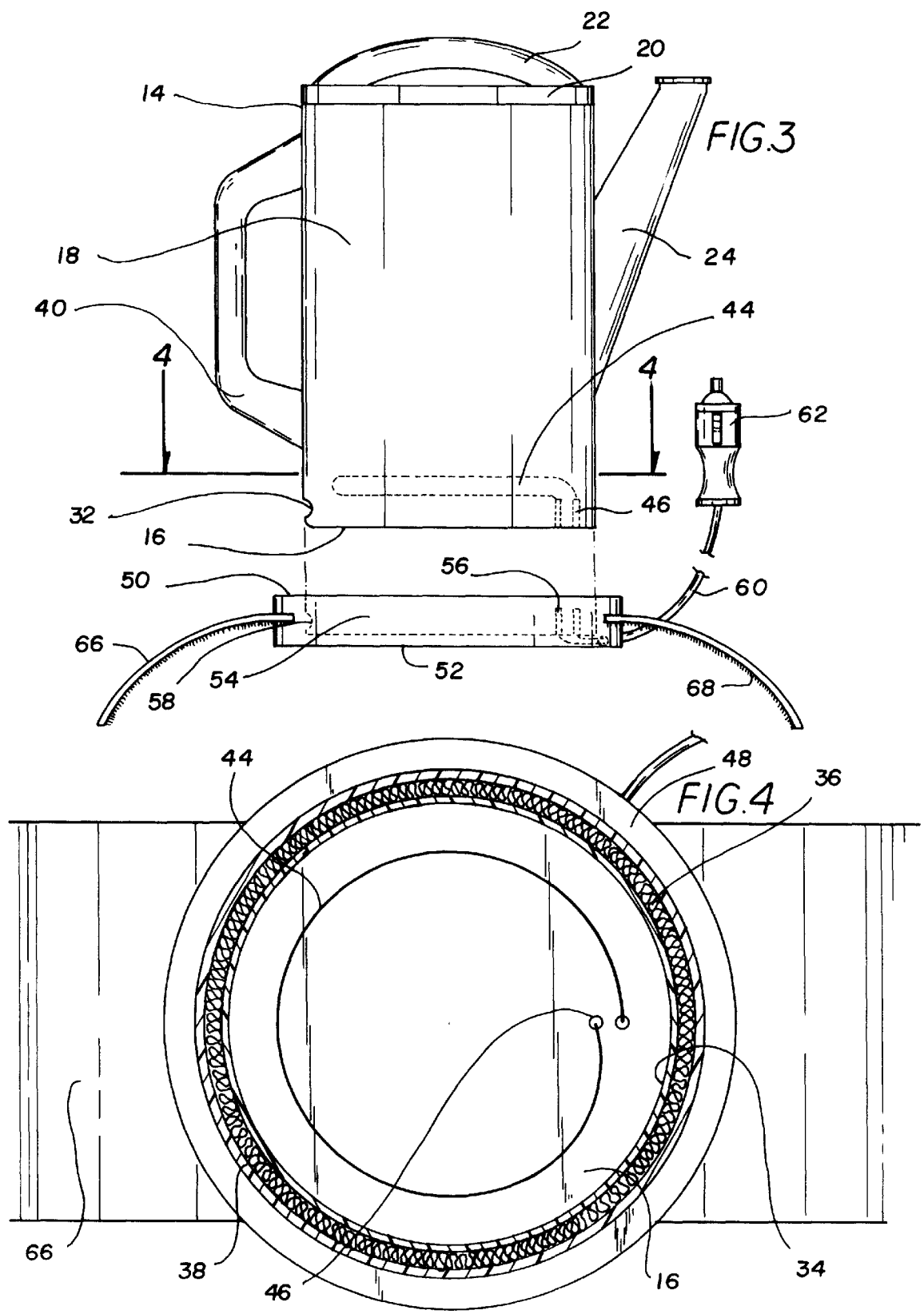

PORTABLE BREWING POT FOR USE IN VEHICLES

BACKGROUND OF THE INVENTION

1. Field of the Invention

The present invention relates to PORTABLE COFFEE MAKERS and more particularly pertains to a new PORTABLE BREWING POT FOR USE IN VEHICLES for BREWING COFFEE AND HOT BEVERAGES WHILE IN A VEHICLE.

2. Description of the Prior Art

The use of PORTABLE COFFEE MAKERS is known in the prior art. More specifically, PORTABLE COFFEE MAKERS heretofore devised and utilized are known to consist basically of familiar, expected and obvious structural configurations, notwithstanding the myriad of designs encompassed by the crowded prior art which have been developed for the fulfillment of countless objectives and requirements.

Known prior art PORTABLE COFFEE MAKERS include U.S. Pat. No. 5,063,838 to Matuschek; U.S. Pat. No. 4,495,404 to Carmichael; U.S. Pat. No. Des. 352,418 to Betts et al.; U.S. Pat. No. 4,382,402 to Alvarez; U.S. Pat. No. 3,955,713 to Hurley; and U.S. Pat. No. 5,440,972 to English.

While these devices fulfill their respective, particular objectives and requirements, the aforementioned patents do not disclose a new PORTABLE BREWING POT FOR USE IN VEHICLES. The inventive device includes a container having a spout extending upwardly from a lower portion thereof. The spout has an open lower end in communication with a hollow interior of the container. The container has a recess formed therein disposed upwardly of a closed lower end thereof. A heating coil is positioned within the hollow interior of the container and is secured to the closed lower end. The heating coil has a pair of female contacts extending outwardly of the closed lower end. A heating plate is provided having a generally cylindrical configuration. The heating plate has an open upper end, a closed lower end and a cylindrical side wall therebetween. The open upper end of the heating plate is dimensioned for receiving the closed lower end of the container therein. An interior surface of the closed lower end of the heating plate has a pair of male contacts extending upwardly therefrom for mating with the female contacts of the heating coil. An interior surface of the cylindrical side wall of the heating plate has a protuberance extending inwardly thereof for engaging the recess in the cylindrical side wall of the container. A power cord is provided having a first end coupled with the pair of male contacts. The power cord has a second end with a cigarette lighter adapter disposed thereon for engaging a cigarette lighter socket of a vehicle.

In these respects, the PORTABLE BREWING POT FOR USE IN VEHICLES according to the present invention substantially departs from the conventional concepts and designs of the prior art, and in so doing provides an apparatus primarily developed for the purpose of BREWING COFFEE AND HOT BEVERAGES WHILE IN A VEHICLE.

SUMMARY OF THE INVENTION

In view of the foregoing disadvantages inherent in the known types of PORTABLE COFFEE MAKERS now present in the prior art, the present invention provides a new PORTABLE BREWING POT FOR USE IN VEHICLES construction wherein the same can be utilized for BREWING COFFEE AND HOT BEVERAGES WHILE IN A VEHICLE.

The general purpose of the present invention, which will be described subsequently in greater detail, is to provide a new PORTABLE BREWING POT FOR USE IN VEHICLES apparatus and method which has many of the advantages of the PORTABLE COFFEE MAKERS mentioned heretofore and many novel features that result in a new PORTABLE BREWING POT FOR USE IN VEHICLES which is not anticipated, rendered obvious, suggested, or even implied by any of the prior art PORTABLE COFFEE MAKERS, either alone or in any combination thereof.

To attain this, the present invention generally comprises a container having a generally cylindrical configuration. The container has an open upper end, a closed bottom end and a cylindrical side wall therebetween. The open upper end has a cover removably coupled thereto. The cover has a handle extending upwardly therefrom. The cylindrical side wall has a spout extending upwardly from a lower portion thereof. The spout has an open lower end in communication with a hollow interior of the container. The spout has an internally threaded open upper end. The internally threaded open upper end removably receives a cap. The cap has a lower externally threaded member for mating with the internally threaded open upper end. The cap has a diameter greater than a diameter of the internally threaded open upper end. The cylindrical side wall has a recess formed therein disposed upwardly of the closed lower end. The cylindrical side wall includes a plastic interior layer, an insulated intermediate layer and a plastic exterior layer. A heating coil is positioned within the hollow interior of the container and secured to the closed lower end. The heating coil has a pair of female contacts extending outwardly of the closed lower end. A heating plate is provided having a generally cylindrical configuration. The heating plate has an open upper end, a closed lower end and a cylindrical side wall therebetween. The open upper end of the heating plate is dimensioned for receiving the closed lower end of the container therein. An interior surface of the closed lower end of the heating plate has a pair of male contacts extending upwardly therefrom for mating with the female contacts of the heating coil. An interior surface of the cylindrical side wall of the heating plate has a protuberance extending inwardly thereof for engaging the recess in the cylindrical side wall of the container. A power cord is provided having a first end coupled with the pair of male contacts. The power cord has a second end with a cigarette lighter adapter disposed thereon for engaging a cigarette lighter socket of a vehicle. A pair of straps extend outwardly from the cylindrical side wall of the heating plate. The pair of straps are diametrically opposed with respect to one another. Each of the straps has hook and loop fasteners disposed on free ends thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new PORTABLE BREWING POT FOR USE IN VEHICLES apparatus and method which has many of the advantages of the PORTABLE COFFEE MAKERS mentioned heretofore and many novel features that result in a new PORTABLE BREWING POT FOR USE IN VEHICLES which is not anticipated, rendered obvious, suggested, or even implied by any of the prior art PORTABLE COFFEE MAKERS, either alone or in any combination thereof.

It is another object of the present invention to provide a new PORTABLE BREWING POT FOR USE IN VEHICLES which may be easily and efficiently manufactured and marketed.

It is a further object of the present invention to provide a new PORTABLE BREWING POT FOR USE IN VEHICLES which is of a durable and reliable construction.

An even further object of the present invention is to provide a new PORTABLE BREWING POT FOR USE IN VEHICLES which is susceptible of a low cost of manufacture with regard to both materials and labor, and which accordingly is then susceptible of low prices of sale to the consuming public, thereby making such PORTABLE BREWING POT FOR USE IN VEHICLES economically available to the buying public.

Still yet another object of the present invention is to provide a new PORTABLE BREWING POT FOR USE IN VEHICLES which provides in the apparatuses and methods of the prior art some of the advantages thereof, while simultaneously overcoming some of the disadvantages normally associated therewith.

Still another object of the present invention is to provide a new PORTABLE BREWING POT FOR USE IN VEHICLES for BREWING COFFEE AND HOT BEVERAGES WHILE IN A VEHICLE.

Yet another object of the present invention is to provide a new PORTABLE BREWING POT FOR USE IN VEHICLES which includes a container having a spout extending upwardly from a lower portion thereof. The spout has an open lower end in communication with a hollow interior of the container. The container has a recess formed therein disposed upwardly of a closed lower end thereof. A heating coil is positioned within the hollow interior of the container and is secured to the closed lower end. The heating coil has a pair of female contacts extending outwardly of the closed lower end. A heating plate is provided having a generally cylindrical configuration. The heating plate has an open upper end, a closed lower end and a cylindrical side wall therebetween. The open upper end of the heating plate is dimensioned for receiving the closed lower end of the container therein. An interior surface of the closed lower end of the heating plate has a pair of male contacts extending upwardly therefrom for mating with the female contacts of the heating coil. An interior surface of the cylindrical side wall of the heating plate has a protuberance extending inwardly thereof for engaging the recess in the cylindrical side wall of the container. A power cord is provided having a first end coupled with the pair of male contacts. The power cord has a second end with a cigarette lighter adapter disposed thereon for engaging a cigarette lighter socket of a vehicle.

Still yet another object of the present invention is to provide a new PORTABLE BREWING POT FOR USE IN VEHICLES that can be used for the brewing of hot tea, cocoa and soups.

Even still another object of the present invention is to provide a new PORTABLE BREWING POT FOR USE IN VEHICLES that is adapted for use with a cigarette lighter of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevation view of the present invention.

FIG. 4 is a cross-sectional view of the present invention as taken along line 4—4 of FIG. 3.

DESCRIPTION OF THE PREFERRED EMBODIMENT

Figure 1:
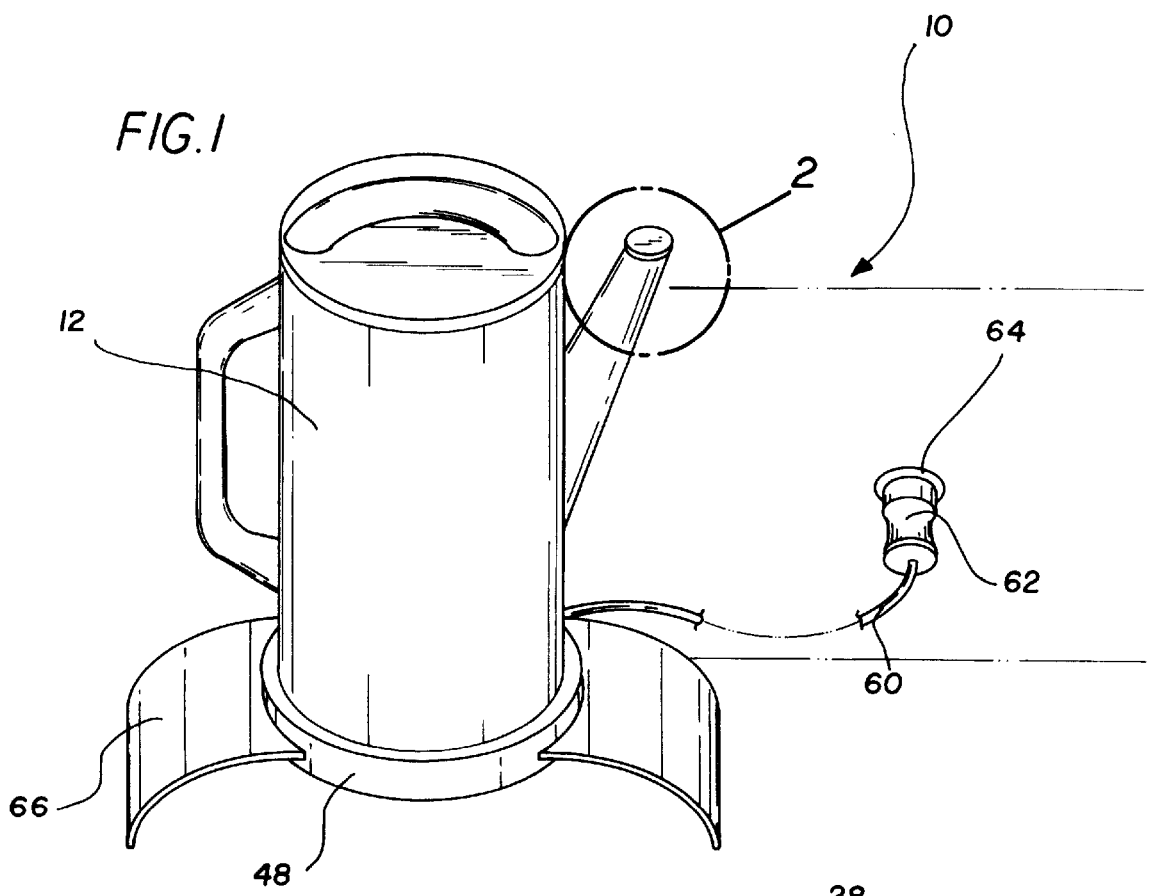
FIG. 1 is a plan perspective view of a new PORTABLE BREWING POT FOR USE IN VEHICLES according to the present invention.
Figure 2:
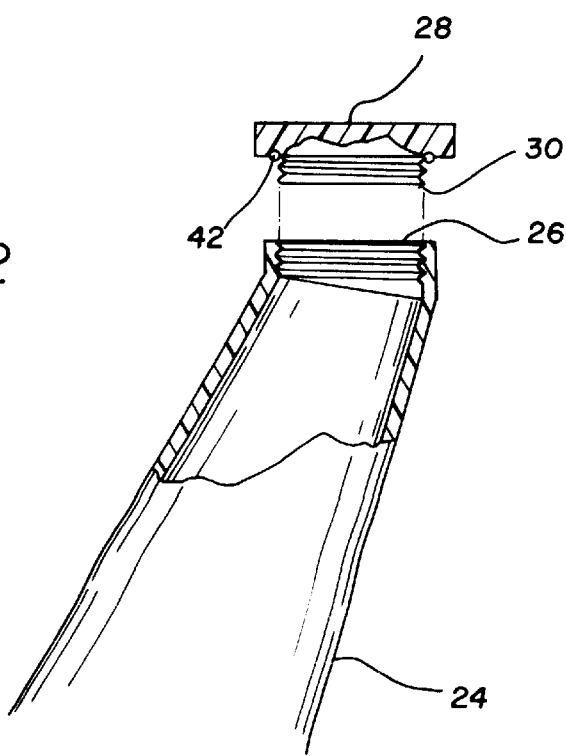
FIG. 2 is a side view of the removable cap for the spout of the present invention as taken from circle 2 of FIG. 1.

With reference now to the drawings, and in particular to FIGS. 1 through 4 thereof, a new PORTABLE BREWING POT FOR USE IN VEHICLES embodying the principles and concepts of the present invention and generally designated by the reference numeral 10 will be described.

As best illustrated in FIGS. 1 through 4, the PORTABLE BREWING POT FOR USE IN VEHICLES 10 comprises a container 12 having a generally cylindrical configuration. The container 12 has an open upper end 14, a closed bottom end 16 and a cylindrical side wall 18 therebetween. The open upper end 14 has a cover 20 removably coupled thereto. The cover 20 has a handle 22 extending upwardly therefrom. The cylindrical side wall 18 has a spout 24 extending upwardly from a lower portion thereof. The spout 24 has an open lower end in communication with a hollow interior of the container 12. The spout 24 has an internally threaded open upper end 26. The internally threaded open upper end 26 removably receives a cap 28. The cap 28 has a lower externally threaded member 30 for mating with the internally threaded open upper end 26. The cap 28 has a diameter greater than a diameter of the internally threaded open upper end 26. The cylindrical side wall 18 has a recess 32 formed therein disposed upwardly of the closed lower end. The cylindrical side wall 18 includes a plastic interior layer 34, an insulated intermediate layer 36 and a plastic exterior layer 38. The container 12 additionally includes a carrying handle 40 having a generally U-shaped configuration and coupled with the cylindrical side wall 18. The container 12 is adapted to hold a predetermined amount of liquid. An o-ring 42 is positioned around the lower externally threaded member 30 to provide a tight seal once the cap 28 is in place on the spout 24.

A heating coil 44 is positioned within the hollow interior of the container 12 and is secured to the closed lower end 16. The heating coil 44 has a pair of female contacts 46 extending outwardly of the closed lower end 16.

A heating plate 48 is provided having a generally cylindrical configuration. The heating plate 48 has an open upper end 50, a closed lower end 52 and a cylindrical side wall 54 therebetween. The open upper end 50 of the heating plate 48 is dimensioned for receiving the closed lower end 16 of the container 12 therein. An interior surface of the closed lower end 52 of the heating plate 48 has a pair of male contacts 56 extending upwardly therefrom for mating with the female contacts 46 of the heating coil 44. An interior surface of the cylindrical side wall 54 of the heating plate 48 has a protuberance 58 extending inwardly thereof for engaging the recess 32 in the cylindrical side wall 18 of the container 12.

A power cord 60 is provided having a first end coupled with the pair of male contacts 56. The power cord 60 has a second end with a cigarette lighter adapter 62 disposed thereon for engaging a cigarette lighter socket 64 of a vehicle.

A pair of straps 66 extend outwardly from the cylindrical side wall 54 of the heating plate 48. The pair of straps 66 are diametrically opposed with respect to one another. Each of the straps 66 has hook and loop fasteners 68 disposed on free ends thereof.

In use, a filter, coffee and water are added to the container 12. The power cord 60 is then plugged in at the dashboard of the vehicle via the cigarette lighter adapter 62 coupled with the cigarette lighter socket 64. The heating coil 46 will then heat up causing the coffee to brew. Once the coffee has brewed, the motorist could remove the cap 28 from the spout 24 and lift the container 12 for pouring into a coffee mug or cup. Returning the container 12 into the heating plate 48 would reconnect the contacts 46,56 to keep the coffee heated while traveling. The pair of straps 66 allow the device 10 to be held securely in place, preferably on a carpeted area with the hook and loop fasteners 68 can engage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable brewing pot for use in vehicles for brewing coffee and hot beverages while in a vehicle comprising, in combination:

a container having a generally cylindrical configuration, the container having an open upper end, a closed bottom end and a cylindrical side wall therebetween, the open upper end having a cover removably coupled thereto, the cover having a substantially inverted U-shaped handle extending upwardly therefrom, the cylindrical side wall having a spout extending upwardly from a lower portion of the cylindrical side wall separate from the cover for drawing liquid from a lower portion of a hollow interior of said container, the spout having an open lower end in communication with the hollow interior of the container, the spout having an internally threaded open upper end, the internally threaded open upper end removably receiving a cap, the cap having a lower externally threaded member for mating with the internally threaded open upper end and a gasket for sealing purposes, the cap having a portion thereof with a diameter greater than a diameter of the internally threaded open upper end;

the cylindrical side wall having a recess formed therein disposed upwardly of the closed lower end;

the cylindrical side wall including a plastic interior layer, an insulated intermediate layer and a plastic exterior layer;

a heating coil positioned within the hollow interior of the container and secured to the closed lower end, the heating coil having a pair of female contacts extending outwardly of the closed lower end opposite the recess;

a heating plate having a generally cylindrical configuration, the heating plate having an open upper end, a closed lower end and a cylindrical side wall therebetween, the open upper end of the heating plate dimensioned for receiving the closed lower end of the container therein, an interior surface of the closed lower end of the heating plate having a pair of male contacts extending upwardly therefrom for mating with the female contacts of the heating coil, an interior surface of the cylindrical side wall of the heating plate having a protuberance extending inwardly thereof opposite the male contacts for engaging the recess in the cylindrical side wall of the container such that the container is prevented from tipping when the protuberance is seated within the recess, wherein the protuberance is positioned adjacent to a side of the heating plate diametrically opposed with respect to the male contacts such that the recess and female contacts of the container function to secure opposite locations of the container to the protuberance and the male contacts of the heating plate;

a power cord having a first end coupled with the pair of male contacts, the power cord having a second end with a cigarette lighter adapter disposed thereon for engaging a cigarette lighter socket of a vehicle; and a pair of straps extending radially outward from the cylindrical side wall of the heating plate, the pair of straps being formed from a relatively thin material with a broad face of each strap directed downwardly, the pair of straps being diametrically opposed with respect to one another, each of the straps having hook-type pile fasteners disposed on the broad face thereof, the straps being flexible for conforming the broad face of each strap and the hook-type pile fasteners thereon to a surface of a floor of a vehicle, the hook-type pile fasteners being adapted for releasable engagement to a carpeted surface within the vehicle such that the heating plate is prevented from slipping with respect to the carpeted surface when the broad face of each strap is engaged to the carpeted surface, the straps having a width greater than half the diameter of said cylindrical heating plate.

* * * * *